United States Patent [19]
Hoult

[11] 4,211,183
[45] Jul. 8, 1980

[54] FISH RAISING

[76] Inventor: David P. Hoult, 39 Norwich Rd., Wellesley, Mass. 02181

[21] Appl. No.: 17,070

[22] Filed: Mar. 2, 1979

Related U.S. Application Data

[63] Continuation of Ser. No. 822,884, Aug. 8, 1977, abandoned.

[51] Int. Cl.[2] .............................................. A01K 63/00
[52] U.S. Cl. ................................................... 119/3
[58] Field of Search ..................................... 119/3, 4, 5

[56]  References Cited
U.S. PATENT DOCUMENTS

| | | |
|---|---|---|
| 3,116,712 | 1/1964 | Ogden et al. ............................. 119/3 |
| 3,661,119 | 5/1972 | Sanders ................................... 119/3 |
| 3,661,262 | 5/1972 | Sanders ................................... 119/3 X |
| 3,842,804 | 10/1974 | Christensen et al. ..................... 119/3 |
| 4,030,450 | 6/1977 | Hoult ....................................... 119/3 |
| 4,038,946 | 8/1977 | Leuthesser et al. ..................... 119/5 |

Primary Examiner—Louis G. Mancene
Assistant Examiner—Robert P. Swiatek

[57] ABSTRACT

Raising food fish utilizing apparatus including a fish tank having a biological filter submerged in it, by recirculating water through the biological filter to remove ammonia, the water in the fish tank being intermittently recirculated and returned to the tank to add oxygen and the fish periodically being fed until they reach marketable size.

22 Claims, 11 Drawing Figures

FISH RAISING

This is a continuation of application Ser. No. 822,884, filed Aug. 8, 1977, and now abandoned.

FIELD OF THE INVENTION

This invention relates to raising food fish to marketable size and, more particularly, to novel apparatus and methods therefor.

RELATED PATENT

In my U.S. Pat. No. 4,030,450, issued June 21, 1977, which is incorporated herein by reference, there are disclosed novel methods and apparatus for maintaining and feeding food fish until they reach marketable size and are removed from the fish tank. In such system, the fist are maintained in a tank having a volume of flowing water in a generally closed water recirculation system having both particulate and biological filters. As a particular feature of the system, the water recirculation is intermittent, in order to provide eonomically important energy savings, since less circulation is necessary when the fish are small than when they are more fully grown.

Although I successfully raised fish on a commercial basis utilizing the apparatus and methods of that patent, certain deficiencies were present which led to further efforts on my part to improve the system, the major objects of which efforts were to improve the operation of the system both functionally and economically.

SUMMARY OF THE INVENTION

The food fish raising methods and apparatus of the present invention include a fish tank for maintaining the fish in a volume of water, a bacteria-supporting water treating means, on which a bacterial mat forms, in communication with and submerged in the volume of water, and water recirculation means for intermittently recirculating the volume of water through the treating means. The fish are periodically fed and the sludge from the bacterial mat is periodically removed from the tank.

The treating means has an inlet, an outlet and a plurality of bacteria-supporting wall means extending therebetween providing a plurality of extended unobstructed passageways having a minimum cross sectional dimension of about one centimeter for free flow of water therethrough in a direction generally parallel to the wall means and in contact with the bacterial mat supported on the wall means.

The area of the wall means exposed in the passageways is preferably at least about 0.5 square feet per gallon of said volume and between about 0.5 and 40 square feet per pound of fish. The passageways extend horizontally and are vertically unobstructed both for horizontal water flow and for gravity removal of the sludge downwardly from the bacterial mat on the wall means. Sludge collection means may be positioned beneath at least a portion of each of the passageways for collecting the sludge fallen from the bacterial mat. The water is intermittently recirculated by flowing it through the passageways, preferably at a scour velocity of between about 0.05 and 0.15 feet per second to react ammonia produced by the fish with bacteria in the bacterial mat on the wall means. The water flow is periodically stopped for reduction of nitrate to evolve nitrogen gas and to cause sludge to fall by gravity downwardly from the bacterial mat. Preferably, its flow is stopped for at least about 5 minutes each hour. Oxygenating means may be provided for oxygenating the water after it flows through the passageways and before it is reintroduced into the fish tank.

For the purpose of more fully describing the above and still further objects and features of the invention, reference is now made to the following detailed description of preferred embodiments thereof, together with the accompanying drawings.

DETAILED DESCRIPTION

Figure 1:
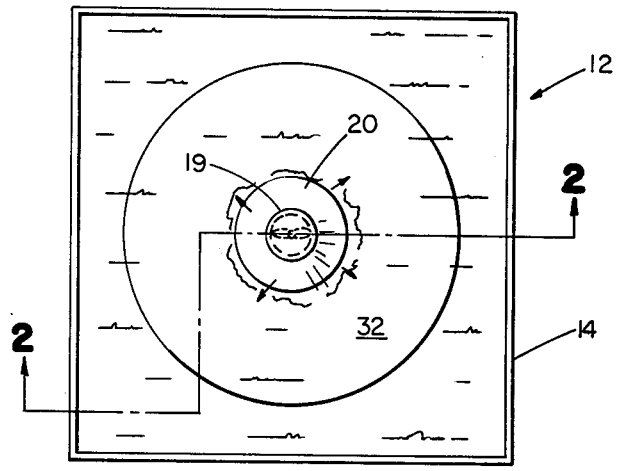
FIG. 1 is a plan view of apparatus according to the invention suitable for carrying out the methods thereof.
Figure 2:
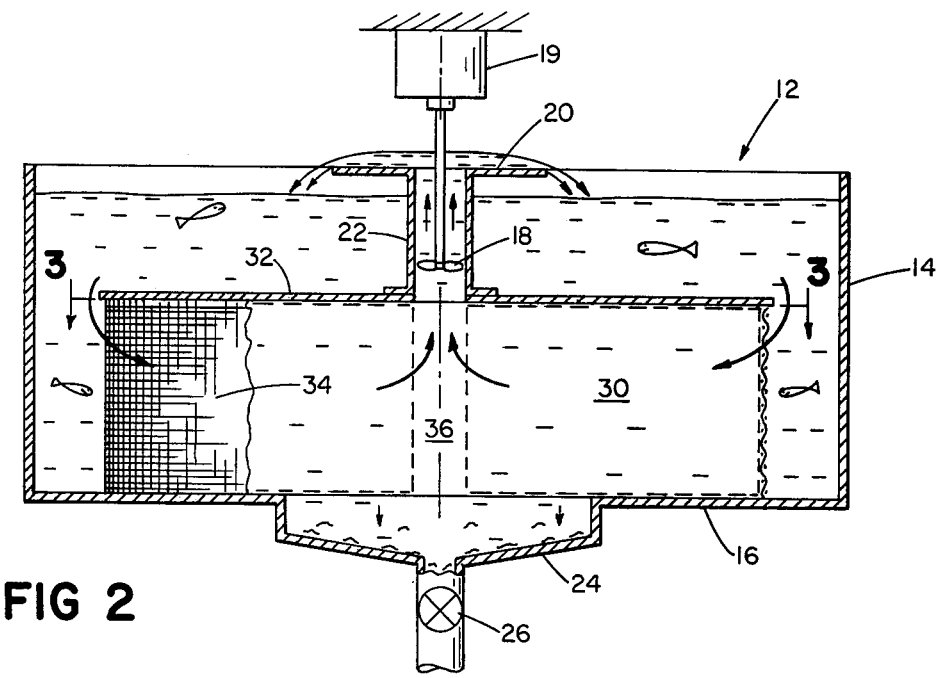
FIG. 2 is a side sectional view of the apparatus of FIG. 1 taken on the line 2—2 thereof.

Referring to the drawings, and particularly to FIGS. 1 and 2 thereof, the apparatus of the invention, in general, includes a shallow fish tank, generally designated 12, having side walls 14 and a bottom wall 16 for maintaining fish in a volume of water of preferably between 300 and 3,000 gallons. An axial flow pump impeller 18 driven by motor 19, preferably intermittently operable by suitable controls as discussed in my U.S. Pat. No. 4,030,450, recirculates the water to oxygenate it by removing it from the outlet of filter 30 and introducing it back into fish tank 12 across spill plate 20 thereabove through central standpipe 22. A sludge collection sump 24 having an outlet valve 26 is provided generally centrally of tank 12 extending therebeneath.

According to the present invention, I provide, positioned beneath horizontal cover plate 32, a novel bacteria-supporting biological water treating assembly, generally designated 30, generally centrally positioned and submerged in tank 12, for forming a suitable bacterial mat for treating the water by biochemical reactions as described in equations (1) through (6) of my said patent beginning at column 5, line 10. In general, such assembly has an inlet around its outer periphery covered by a 1/16 inch nylon mesh screen 34 to prevent the entry of fish, and an outlet around its inner periphery providing a central cylindrical opening 36 concentric with standpipe 22 and extending downwardly therebeneath. A plurality of bacteria-supporting walls extend between the inlet and outlet, as hereinafter described, providing a plurality of extended unobstructed passageways each having a cross sectional dimension of about one to three centimeters to allow for the growth of the bacterial mat and to allow for free flow of water therethrough in a direction generally parallel to the walls and in contact with the bacterial mat supported on the walls. It is desirable that the passageways extend horizontally and be vertically unobstructed for gravity removal of the sludge from the bacterial mat on the walls of assembly 30.

The exposed area of the bacteria-supporting walls relatively to the volume of water in tank 12 and the weight of fish present must be relatively large in order to support a fish population of the desired density of at least about ¾ to one pound of fish per gallon for economical operation of the system. In this regard, I have found that the exposed wall area should be at least about 0.5 square feet per gallon of water and between about 0.5 to 40 square feet per pound of fish. It should be pointed out that if the area is greater than about 40 square feet per pound of fish, the system will not operate because of insufficient biological action. Nor will it operate if the fish are not fed regularly, at least on a daily basis. Periodic sludge removal, also at least on a daily basis, is necessary to avoid killing the fish.

Water should be recirculated through the passageways at a scour velocity of between about 0.05 and 0.15 feet per second. I have found that this range of scour velocity is important because, if it is too low, the bacterial mat grows across the passageways and blocks them and, if it is too high, the bacterial mat never forms. It is preferable, although not essential, that the scour velocity be constant across the assembly, preferably at a value of about 0.07 feet per second.

Structure of a suitable water treating assembly 30 meeting the above defined criteria may take several forms.

In FIGS. 3 through 6 is shown a particularly effective, compact assembly 30 having a large exposed area, in the form of a plurality of vertically extended spiral elements, generally designated 40, with their exposed surfaces spaced about one to three centimeters from one another to provide horizontally extended, vertically unobstructed spiral passageways of such geometry that the desired constant scour velocity is produced. The width of elements 40 is exaggerated in FIG. 3 to more clearly show their construction.

Each of the spiral elements 40 comprises a spiral frame 42 supporting 1/16 inch mesh nylon netting 44 stretched therearound, so that a single or double layer of netting 44 is provided for supporting the bacterial mat upon which the operation of the system depends.

Figure 3:
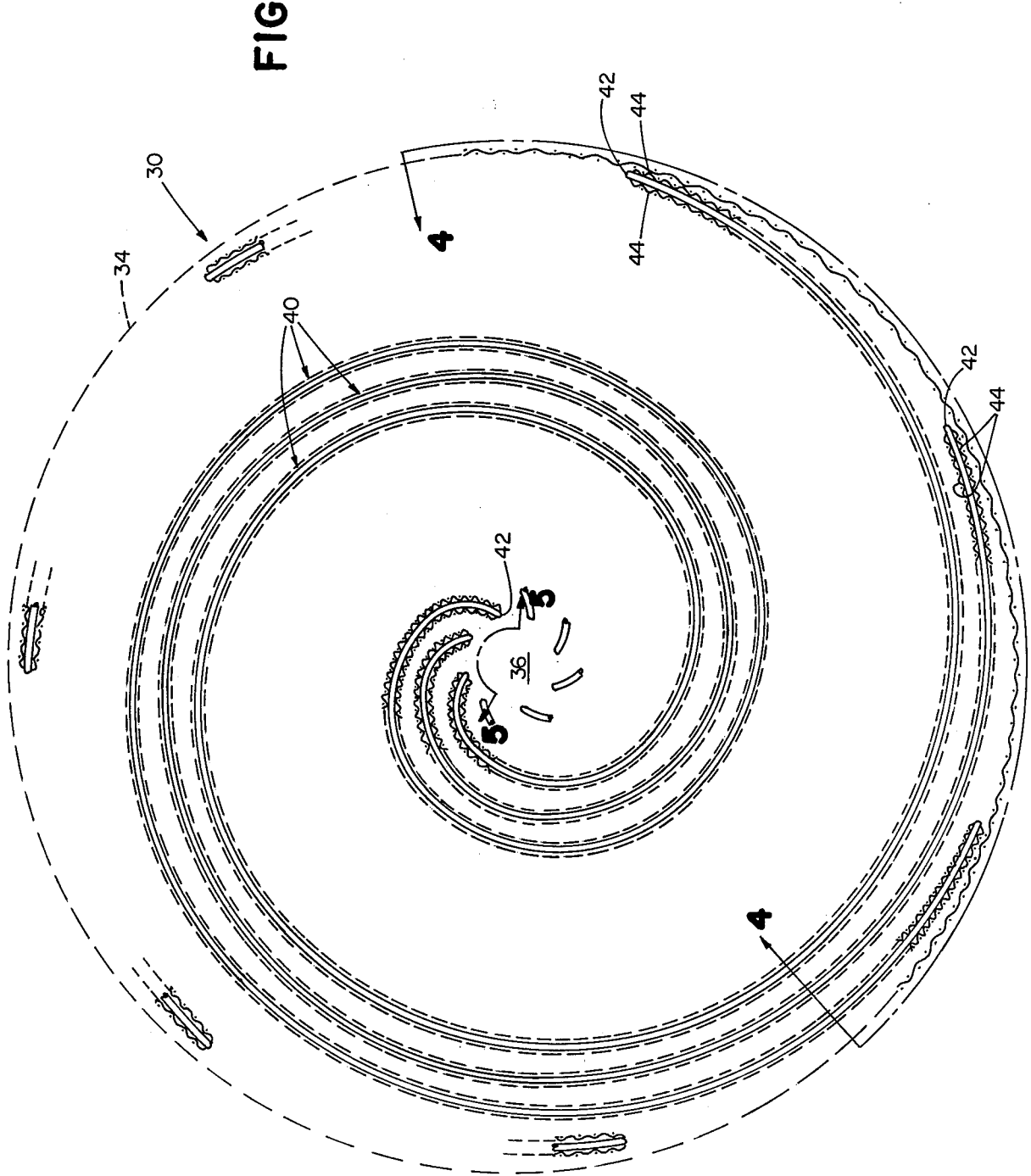
FIG. 3 is a plan view of a first embodiment of the bacteria-supporting treating means of the invention.
Figure 4:
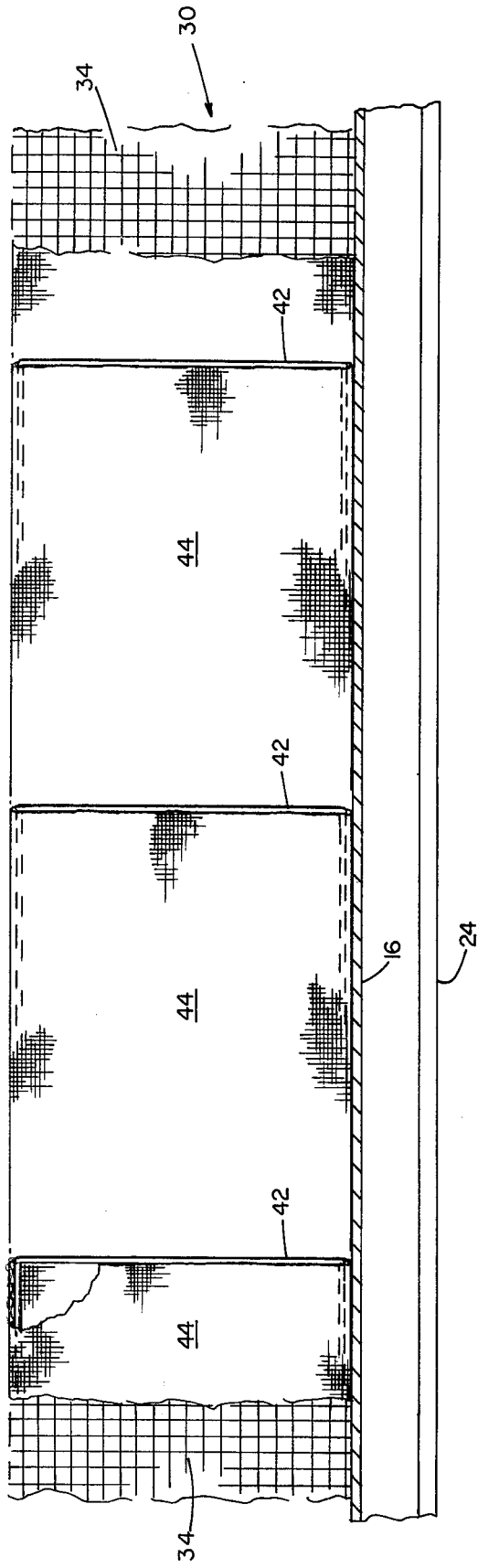
FIG. 4 is a partial, developed end view, partly broken away, of the outside of the embodiment of FIG. 3.
Figure 5:
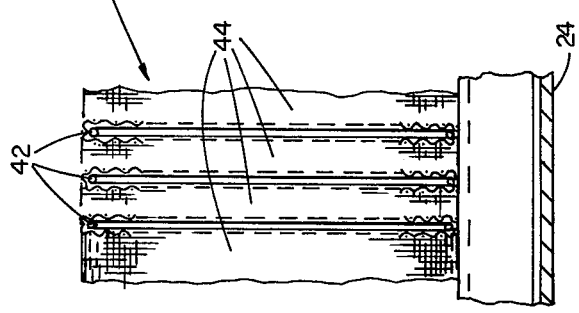
FIG. 5 is a partial, developed end view of the inside of the embodiment of FIG. 3.
Figure 7:
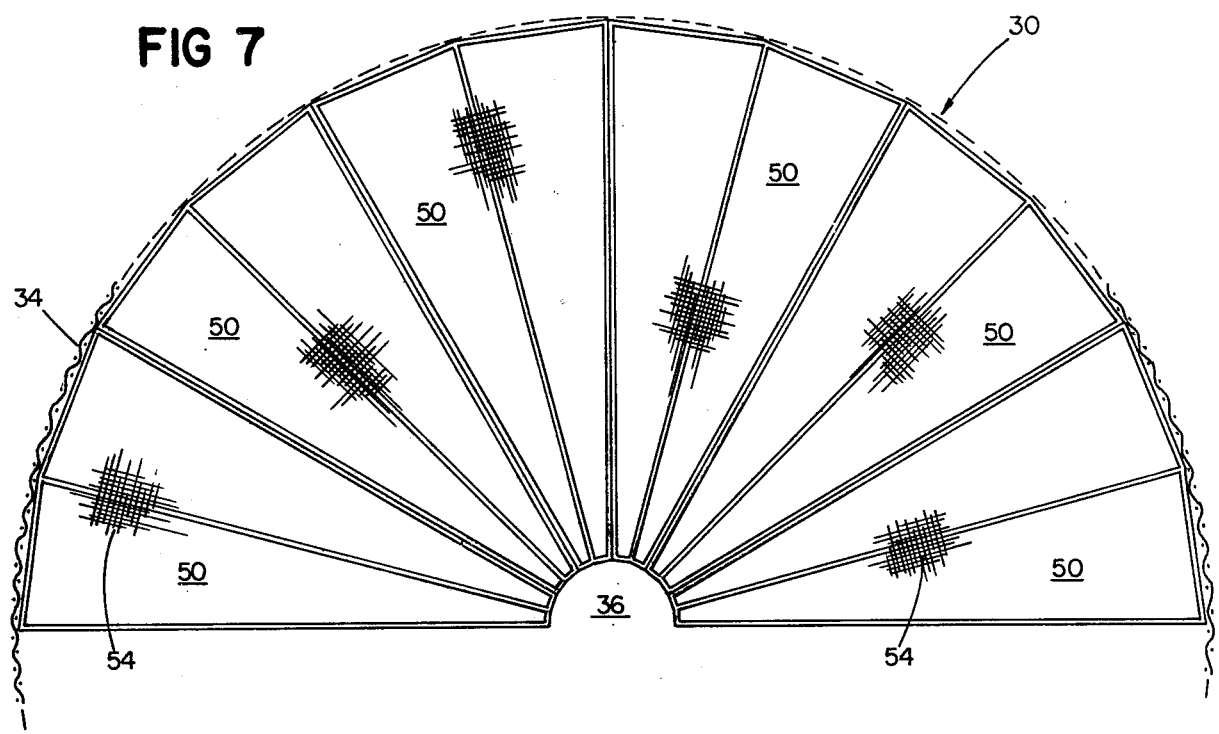
FIG. 7 is a partial plan view of a second embodiment of the bacteria-supporting treating means of the invention and FIGS. 8 through 11 are top, side and end views of the elements of the bacteria-supporting means of FIG. 7.
Figure 8:
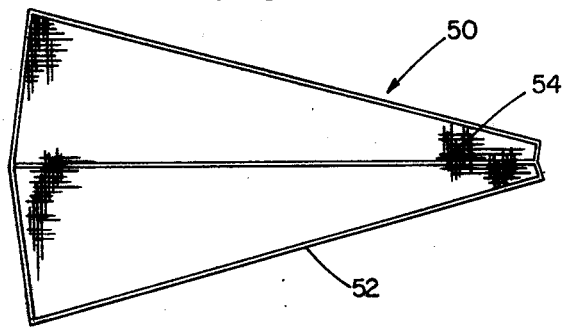
Figure 9:
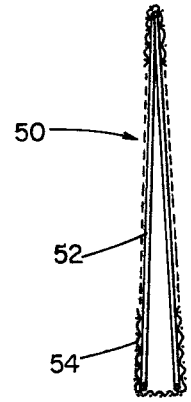
Figure 10:
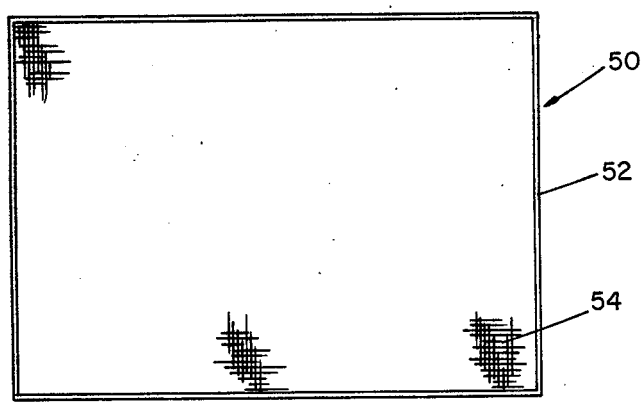
Figure 11:
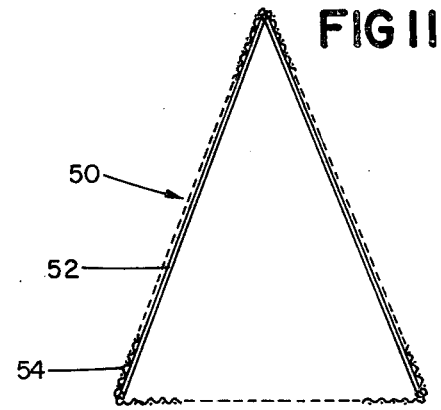

In a specific example, the assembly of FIGS. 3 through 5, submerged in four feet of water in a tank 12 of ten feet by ten feet in horizontal dimensions, is eight feet in diameter and thirty inches high and consists of twenty-four spiral elements 40 spaced about two centimeters apart. The exposed area is about 400,000 square inches, providing a ratio of about 2½ square foot per pound of fish with the fish fully grown to weight about ¾ pound each.

Figure 6:
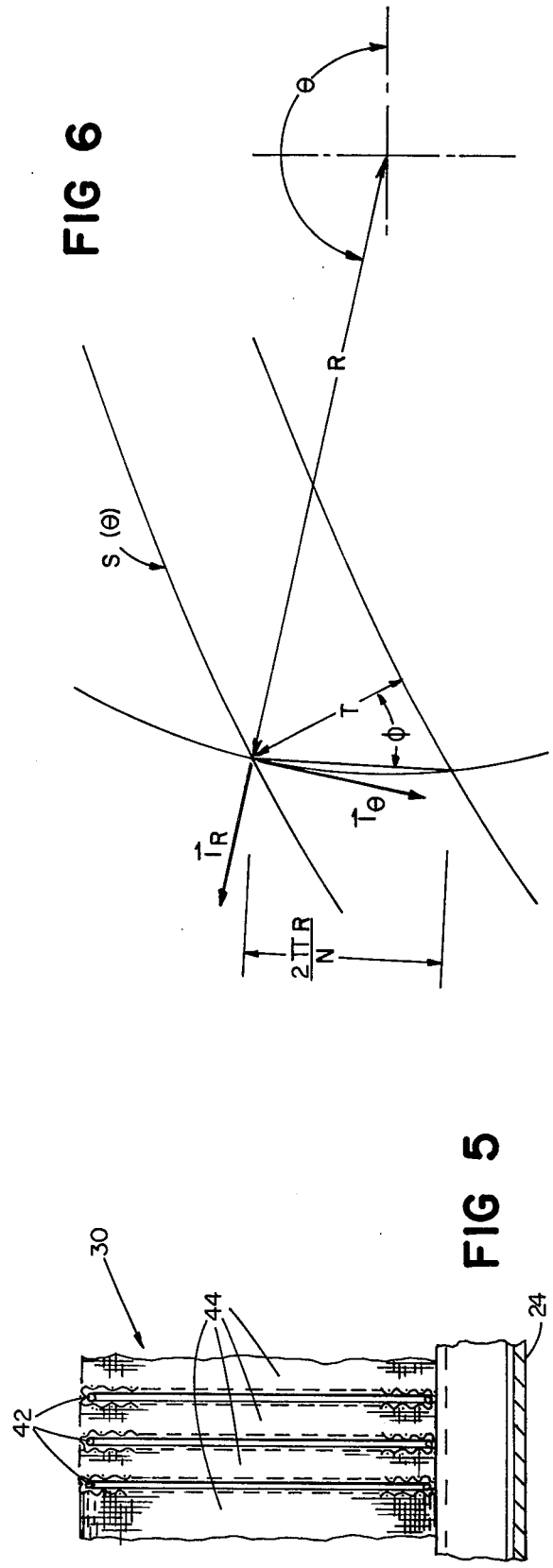
FIG. 6 illustrates the geometry of a specific example of the embodiment of FIG. 3.

Referring to FIG. 6, the derivation of the most desirable spiral curve of elements 40 is as follows. In polar coordinates, let the coordinates of the curve be (R, θ). Let the shape of the spiral be described by $$R = S(\theta) \tag{1}$$

If $S' = ds/d\theta$, then the unit vector normal to the curve, $1_n$, is $$1_n = \frac{-S 1_R + S' 1_\theta}{\sqrt{(S')^2 + S^2}} \tag{2}$$

where $1_R$, $1_\theta$ are the unit vectors in the R, θ directions.

Suppose there are N elements 40, and that the perpendicular distance between them is required to be T, a constant.

At a radius R, the perimeter is $2\pi R$, and each element 40 is spaced $2\pi R/N$ apart from its neighbors, on the perimeter.

$2\pi R/N$ lies in the $1_\theta$ direction, and T lies in the $1_n$ direction. The angle between $1_n$ and $1_\theta$ is $\phi$, and, by geometry (see FIG. 6)

$$\cos\phi = 1_n \cdot 1_\theta = NT/2\pi R \tag{3}$$

But from equation (2) and (1) we obtain $$\frac{S'}{\sqrt{(S')^2 + S^2}} = \frac{NT}{2\pi S} \tag{4}$$

which is the differential equation for $S(\theta)$.

The length of the spiral, L, is $$L = \int \sqrt{(dR)^2 + R^2(d\theta)^2} = \int \sqrt{(S')^2 + S^2}\, d\theta$$

which may be written, in view of (4), as $$L = \int_{R_1}^{R_2} \frac{2\pi S S'\, d\theta}{NT} = \frac{\pi}{NT}(R_2^2 - R_1^2) \tag{5}$$

where $R_1$ is the inner radius and $R_2$ the outer radius of assembly 30.

If the assembly 30 has a dpeth D, then the total area of the assembly is (each element 40 has 2 sides)

$$2 NLD = D \frac{2\pi}{T}(R_2^2 - R_1^2) \tag{6}$$

A typical solution to equation (4) is illustrated by the element 40 of FIG. 3.

The scour velocity, $V_s$, is determined as follows: If the total flow through the assembly 40 is Q, then the flow through each of the N passageways, which are T wide and D deep, must have a velocity in ft/sec of $$NV_sTD = Q \tag{7}$$

The specific velocity used is 0.07 ft/sec.

In FIGS. 7 through 11 is shown another form of assembly 30 in the form of a plurality of elements generally designated 50 having a frame 52 of vertical triangular section and of truncated horizontal shape having a flat bottom about which 1/16 inch mesh nylon netting 54 is stretched to provide radial passages on which the bacterial mat is supported. Although this assembly is in some respects not as efficient as that of FIGS. 3 through 6, both because of its smaller area and because the scour velocity through it is not constant because of the decreasing cross section and hence increasing scour velocity (see equation (7) above) as the recirculated water flows inwardly, it has the advantages of simplicity and easy removal for cleaning. It has been used successfully with the parameters discussed above present at least within a significant portion of its radial length.

In operation of both forms of bacteria-supporting assembly 30, the water is recirculated intermittently after it flows through the passageways to oxygenate it as it drops from the rim of splash plate 16 back into tank 12 and to move it through the bacteria-supporting assembly 30.

As has been noted above, in each of the above described assemblies 30, the purpose of the nylon netting on elements 40 and 50 is to hold the bacteria and slime mat necessary to digest the ammonia produced by the fish as the water flows parallel to it inwardly as it is recirculated by impeller 18. With a sufficient number of fish in tank 12, say at least about ¾ pounds of fish per gallon, fed on a periodic basis at least daily, a biological mat forms on the nylon netting within the range of scour velocities of about 0.05 to 0.15. These velocities must be kept low since the mat is quite fragile and will wash off at too high a velocity. At too low a velocity, it becomes too thick and tends to clog the relatively narrow passageways.

In operation, with the water recirculated intermittently as described in my said patent beginning at column 5, line 10, with the biological assembly of the present invention, when water is flowing through the assembly, along the surface of the biological mat, the ammonia produced by the fish and by the decomposition of organic material, in accordance with equations (1) and (2) of said patent, reacts with the biological mat in accordance with equations (3), (4) and (5) of said patent.

Water recirculation is stopped, within assembly 30 at least daily for a period of time of at least 5 and up to about 55 minutes each hour so that reduction of the nitrate to evolve nitrogen gas may proceed in accordance with equation (6) of said patent. This evolution causes the sludge, formed mainly of dead cells of the biological mat, to be removed from the mat. The sludge falls by gravity downwardly and collects in sump 24. Thereafter, water flow is restarted. The sludge must be removed at least daily through valve 25 to prevent its reacting in accorance with reactions (1) and (2) of said patent to evolve ammonia which may kill the fish within a matter of hours.

In accordance with the present invention, the intermittent water flow, in addition to providing savings in pump power in accordance with the teaching of said patent, is necessary for carrying out the necessary sequence of biological reactions, since reactions (3) through (5) occur while the water is flowing and reaction (6) occurs when the flow has stopped.

I claim:

1. Apparatus for raising food fish, comprising
a fish tank for maintaining said fish in a volume of water, said fish tank having a central outlet
bacteria-supporting water treating means mounted generally centrally in said tank submerged in said volume of water,
said treating means having
inlet means around its outer periphery
a central outlet surrounding said fish tank outlet and
a plurality of bacteria supporting wall means extending between its periphery and its outlet providing a plurality of horizontally extended unobstructed passageways, each of said passageways having a cross sectional dimension of about one to three centimeters for free flow of water therethrough in contact with bacteria supported on said wall means
said passageways being vertically unobstructed for gravity removal of sludge therefrom
sludge collection means in said tank beneath at least a portion of each of said passageways and
water recirculation means including axial flow pump means for intermittently pumping said water upwardly through said tank central outlet for intermittently recirculating said water through said passsageways.

2. Apparatus as claimed in claim 1, further including screen means extending around the outer periphery of said treating means for preventing entry of fish into said passageways.

3. Apparatus as claimed in claim 1, wherein
said wall means extend generally radially between said outer periphery and central outlet of said treating means around the periphery thereof.

4. Apparatus as claimed in claim 1, wherein
said wall means extend generally spirally between said outer periphery and central outlet of said treating means.

5. A method of raising food fish in a fish tank, comprising
maintaining said fish in a volume of water in said tank,
providing said tank with a submerged bacteria-supporting water treating means therein,
providing said treating means with a plurality of bacteria-supporting wall means providing a plurality of extended, vertically and horizontally unobstructed passageways having a minimum cross sectional dimension of about one centimeter for free flow of water therethrough in a direction generally parallel to said wall means and in contact with a bacterial mat supported on said wall means and water recirculation means for recirculating water through said tank and said passageways
supporting a bacterial mat on said wall means
recirculating water from said fish tank through said passageways by intermittently flowing said water to react ammonia produced by said fish with bacteria in said bacterial mat on said wall means
periodically stopping said water flow for reduction of nitrate to evolve nitrogen gas and to cause sludge to fall by gravity downwardly from said bacterial mat, and
periodically removing said sludge.

6. A method as claimed in claim 5, wherein
said water is intermittently flowed through said passageways at a velocity of between about 0.05 and 0.15 feet per second.

7. A method as claimed in claim 6, wherein
the area of said wall means exposed in said passageways is at least about 0.5 to 2 square feet per gallon of water of said volume.

8. A method of raising food fish in a fish tank, comprising
maintaining said fish in a volume of water in said tank
providing said tank with a submerged bacteria-supporting water treating means therein,
providing said treating means with a plurality of bacteria-supporting wall means providing a plurality of extended, vertically and horizontally unobstructed passageways having a cross sectional dimension of about one to three centimeters for free flow of water therethrough in a direction generally parallel to said wall means and in contact with a bacterial mat supported on said wall means and water recirculation means for recirculating water through said tank and said passageways
supporting a bacterial mat on said wall means
recirculating water from said fish tank through said passagways by intermittently flowing said water to react ammonia produced by said fish with bacteria in said bacterial mat on said wall means oxygenating said water after passage thereof through said passageways and before reintroduction thereof into said fish tank periodically stopping said water flow for reduction of nitrate to evolve nitrogen gas and to cause sludge to fall by gravity downwardly from said bacterial mat, and periodically removing said sludge.

9. A method as claimed in claim 8, wherein said water is intermittently flowed through said passageways at a velocity of between about 0.05 and 0.15 feet per second.

10. A method as claimed in claim 9, wherein the area of said wall means exposed in said passageways is at least about 0.5 to 2 square feet per gallon of water of said volume.

11. A method as claimed in claim 10, wherein the area of said wall means exposed in said passageways is at least about 0.5 and 40 square feet per pound of fish.

12. A method as claimed in claim 11, wherein said fish are maintained in said volume of water at a ratio of at least about 0.75 pounds of fish per gallon of water.

13. A method of raising food fish in a fish tank, comprising maintaining said fish in a volume of water in said tank at a ratio of at least about 0.75 pounds of fish per gallon of water said tank having bacteria-supporting water treating means in communication therewith, said treating means having a plurality of bacteria-supporting wall means providing a plurality of horizontally extended vertically unobstructed passageways having a cross sectional dimension of about one to three centimeters for free flow of water therethrough in a generally horizontal direction generally parallel to said wall means and in contact with a bacterial mat supported on said wall means the area of said wall means exposed in said passageways being at least about 0.5 to 2 square feet per gallon of water of said volume and being between about 0.5 and 40 square feet per pound of fish supporting a bacterial mat on said wall means recirculating water from said fish tank generally horizontally through said passageways by intermittently flowing said water in a generally horizontal direction at a velocity of between about 0.05 and 0.15 feet per second to react ammonia produced by said fish with bacteria in said bacterial mat on said wall means oxygenating said water after passage thereof through said passageways and before reintroduction thereof into said fish tank periodically stopping said water flow for reduction of nitrate to evolve nitrogen gas and to cause sludge to fall by gravity downwardly from said bacterial mat, and removing said sludge.

14. Apparatus for raising food fish, comprising a fish tank for maintaining said fish in a volume of water bacteria-supporting water treating means submerged in said volume of water, said treating means having an inlet an outlet and a plurality of bacteria-supporting wall means extending between said inlet and outlet providing a plurality of horizontally extended unobstructed passageways having a minimum cross sectional dimension of about one centimeter for free flow of water generally horizontally therethrough in contact with bacteria supported on said wall means, said passageways being vertically unobstructed for gravity removal of sludge therefrom sludge collection means beneath at least a portion of said passageways, and water recirculation means for recirculating said volume of water through said fish tank and said treating means.

15. Apparatus as claimed in claim 14, further including water oxygenating means for said fish tank, and wherein said water recirculating means includes pump means connected to said oxygenating means for pumping said water upwardly from said outlet and through said oxygenating means before its reintroduction into said fish tank.

16. Apparatus as claimed in claims 14 or 15, wherein said passageways are spaced one to three centimeters.

17. Apparatus as claimed in claims 14 or 15, wherein said water treating means is mounted in said tank submerged in said volume.

18. Apparatus as claimed in claims 14 or 15, wherein said water recirculation means operates intermittently.

19. Apparatus as claimed in claims 14 or 15, further including screen means across said inlet for preventing entry of fish into said passageways.

20. Apparatus for raising food fish, comprising a fish tank for maintaining said fish in a volume of water, said fish tank having an outlet bacteria-supporting water treating means mounted in said fish tank submerged in said volume of water, said treating means having an inlet an outlet and a plurality of bacteria-supporting wall means extending between said treating means inlet and outlet providing a plurality of horizontally extended unobstructed passageways having a minimum cross sectional dimension of about one centimeter for free flow of water generally horizontally therethrough in contact with bacteria supported on said wall means, said passageways being vertically unobstructed for gravity removal of sludge therefrom sludge collection means in said tank beneath at least a portion of each of said passageways water oxygenating means for said tank, and water recirculation means including pump means connected to said oxygenating means for intermittently pumping said water upwardly from said tank outlet and through said water oxygenating means before its reintroduction into said fish tank for recirculating said water through said fish tank and passageways.

21. Apparatus as claimed in claims 1, 2, 3, 4, 14, 15 or 20, wherein said wall means is formed of netting for supporting a bacterial mat thereon.

22. Apparatus as claimed in claims 14, 15 or 20, wherein the area of said wall means exposed in said passageways is at least about 0.5 square feet per gallon of said volume.

* * * * *

UNITED STATES PATENT AND TRADEMARK OFFICE
CERTIFICATE OF CORRECTION

PATENT NO. : 4,211,183
DATED : July 8, 1980
INVENTOR(S) : David P. Hoult

It is certified that error appears in the above-identified patent and that said Letters Patent are hereby corrected as shown below:

Column 1, line 18, "fist" should be --fish--;

Column 4, line 26, "$L = \int_{R_1}^{R_2} \frac{2\pi S \, S' \, d\theta}{NT} = \frac{\pi}{NT} (R^2_2 - R^2_1)$" should be $$--L = \int_{R_1}^{R_2} \frac{2\pi S \, S' \, d\theta}{NT} = \frac{\pi}{NT} (R^2_2 - R^2_1) --;$$

Column 4, line 33, "dpeth" should be --depth--;

Column 6, line 68, "passagways" should be --passageways--.

Signed and Sealed this

Eighteenth Day of November 1980

[SEAL]

Attest:

SIDNEY A. DIAMOND

Attesting Officer

Commissioner of Patents and Trademark